: US 6,947,489 B2
(45) Date of Patent: *Sep. 20, 2005

(12) United States Patent
Krasner

(54) COMBINED PREAMBLE DETECTION AND INFORMATION TRANSMISSION METHOD FOR BURST-TYPE DIGITAL COMMUNICATION SYSTEMS

(75) Inventor: Norman Franklin Krasner, San Carlos, CA (US)

(73) Assignee: Gilat Satellite Networks, Ltd., Petah Tikva (IL)

( * ) Notice: Subject to any disclaimer, the term of this patent is extended or adjusted under 35 U.S.C. 154(b) by 320 days.

This patent is subject to a terminal disclaimer.

(21) Appl. No.: 10/027,234

(22) Filed: Dec. 27, 2001

(65) Prior Publication Data

US 2002/0154720 A1 Oct. 24, 2002

Related U.S. Application Data

(63) Continuation of application No. 09/075,826, filed on May 12, 1998, now Pat. No. 6,373,899.
(60) Provisional application No. 60/051,234, filed on Jun. 30, 1997.

(51) Int. Cl.[7] .............................................. H04L 27/00
(52) U.S. Cl. ...................... 375/259; 375/140; 375/343; 375/367; 370/514
(58) Field of Search ................................ 375/342–343, 375/142, 150, 259, 140, 130, 145, 149, 354, 356, 359, 364, 365, 367, 242, 244, 283, 316, 295; 370/503, 507, 510–514, 520

(56) References Cited

U.S. PATENT DOCUMENTS 3,730,998 A    5/1973    Schmidt et al.
3,778,715 A    12/1973   Schmidt et al.
3,806,879 A    4/1974    Schmidt et al.
3,812,430 A    5/1974    Schmidt et al.
3,816,666 A    6/1974    Tomozawa et al.
3,818,453 A    6/1974    Schmidt et al.
3,838,221 A    9/1974    Schmidt et al.
4,169,286 A  * 9/1979    Uzunoglu et al. .......... 708/815
4,697,277 A    9/1987    Van Rassel
4,745,408 A  * 5/1988    Nagata et al. ............. 340/7.36
5,025,455 A  * 6/1991    Nguyen ...................... 375/327
5,195,108 A    3/1993    Baum et al.
5,428,647 A    6/1995    Rasky et al.
5,550,833 A  * 8/1996    Fujisawa .................... 370/514
5,598,429 A    1/1997    Marshall
5,668,431 A  * 9/1997    Saw et al. ............... 310/313 R
6,282,232 B1 * 8/2001    Fleming et al. ............ 375/147

FOREIGN PATENT DOCUMENTS

DE    27 56 923 AL    7/1979
EP    0 257 110 A     3/1988
WO    WO 87/01490    3/1997

* cited by examiner

Primary Examiner—Jean B. Corrielus
(74) Attorney, Agent, or Firm—Banner & Witcoff Ltd.

(57) ABSTRACT

Burst transmissions in a burst-type communication system include a preamble synchronization sequence which allows detection and synchronization a burst transmission while at the same time providing information to a receiver, for example, on the subsequent burst payload data. Each burst transmission includes a preamble synchronization sequence which is one of a plurality of predetermined allowed preamble sequences in the system, according to the information desired to be transmitted. The system may also use differential encoding and decoding to eliminate the effects of frequency uncertainty. In that case, the allowed preamble sequences may be such that, after differential decoding, they differ from one another only by a polarity inversion such that a single matched filter may be used to detect two preamble sequences.

6 Claims, 3 Drawing Sheets

COMBINED PREAMBLE DETECTION AND INFORMATION TRANSMISSION METHOD FOR BURST-TYPE DIGITAL COMMUNICATION SYSTEMS

This application is a continuation of U.S. patent application Ser. No. 09/075,826, filed on 12 May 1998, issued as U.S. Pat. No. 6,373,899, which claims the benefit of priority under 35 U.S.C. § 119 of U.S. Provisional Application No. 60/051,234, filed Jun. 30, 1997.

BACKGROUND OF THE INVENTION

1) Field of the Invention

This invention pertains to the field of digital communication systems, and more particularly to digital communication signal detection and synchronization.

2) Background of the Related Art

Many modern digital communications systems utilize burst type transmissions in which a relatively small number of information bits are transmitted by sending a sequence of a small number of waveforms, say "N" in number, termed "symbols," each of which symbols can assume one of "Q" possible shapes. As an example, Q=4 for the case of quadraphase shift keying (QPSK).

In a burst-type communication system it is important to rapidly detect the onset of the signal at the receiver and to perform time synchronization to it. To facilitate this, in many burst-type communication systems a burst consists of a initial set of symbols, termed a "preamble," which permits rapid synchronization, and a subsequent set of symbols, termed a "payload," which represents the actual message data. Some systems also include special data in the middle of the burst, or at the end, which is termed a "postamble."

Time synchronization for a burst-type communication system includes two aspects: (1) determining the timing of the symbols, and (2) determining the onset of the actual payload data carried by the burst. It is important that such synchronization be performed using the preamble data so that the payload data may be correctly decoded. Determining the onset of payload data in a burst transmission is typically performed through the transmission during the preamble of a specific sequence of symbols, termed a "unique word."

Time synchronization is to be distinguished from determination of received signal carrier frequency and phase, which is termed "carrier synchronization."

In addition to allowing time synchronization, the preamble may be used to transmit a limited amount of information that describes the subsequent payload data. For example, such information may specify the length of the payload (number of symbols), the modulation format of the payload data, or other information.

In conventional systems the above information is sent in the preamble by the normal manner of associating individual symbols with information bits. However, in situations in which the received signal level is low, such individual symbols may be obscured by noise such that this conventional approach will lead to very high error rates.

Accordingly, it would be advantageous to provide a system and method which will perform both time synchronization and information transmission via a preamble when the input signal level is low. Other and further objects and advantages will appear hereinafter.

SUMMARY OF THE INVENTION

The present invention comprises a combined synchronization and information transfer method and system in a burst-type communication system.

In one burst-type communication system of the present invention having a transmitter and a receiver, a method of communicating information in a preamble synchronization sequence of a burst transmission includes selecting, at the transmitter, a selected one of a plurality of initial detection sequences, representing one or more first preamble information bits; selecting, at the transmitter, a selected one of a plurality of unique words, representing one or more second preamble information bits; transmitting, at the transmitter, said preamble synchronization sequence comprising said selected one initial detection sequence and said selected one unique word; receiving, at the receiver, said preamble synchronization sequence; detecting, at the receiver, said one initial detection sequence to produce first time synchronization information and to receive said one or more first preamble information bits; and detecting, at the receiver, said one unique word to produce second time synchronization information and to receive said one or more second preamble information bits.

In one aspect of the invention, a burst-type communication system employs differential encoding and decoding. Differential decoding operates on the differentially encoded data to remove the effects of signal carrier frequency uncertainty from the signal and enables processing a large number of symbols by a subsequent matched filter without the deteriorating effects of such carrier frequency uncertainty.

In another aspect of the invention, a burst-type communication system employs matched filtering, permitting integration of a received signal over a large number of symbols, thereby producing a strong detection output even when the individual signal symbols are weak relative to the noise level. This integration may permit detection even when, for example, the power of the symbols equals the power of the noise.

In yet another aspect of the present invention, each burst transmission in a burst-type communication system includes one of a number "S" allowed synchronization sequences, S>1. A receiver includes one or more multiple matched filters to decide which of the S allowed synchronization sequences was transmitted.

In a further aspect of the present invention, one of two synchronization sequences may be transmitted, such that after differential decoding, the two synchronization sequences only differ from one another by a polarity inversion. In this case a single matched filter may be used to detect both synchronization sequences.

In yet a further aspect of the present invention, one or more bits of preamble information is communicated in a synchronization sequence in a burst transmission. Each burst may include one of "S" allowed synchronization sequences. The selection of a particular synchronization sequence among the "S" allowed synchronization sequences communicates $\log_2(S)$ preamble information bits. Each synchronization sequence may be divided into two or more sections with one or more bits of information communicated in each section.

DESCRIPTION OF THE PREFERRED EMBODIMENTS

Embodiments and other aspects of the invention described herein, including the system embodiments described below, may be made or used in conjunction with inventions described, in whole or in part, in co-pending U.S. patent application Ser. No. 09/050,114 filed Mar. 30, 1998 in the name of inventors Philip Freiden, David Decker, Michael Serrone and Norman Krasner entitled "Correlator Method and Apparatus" which is hereby incorporated by reference as if fully set forth herein.

Figure 1:
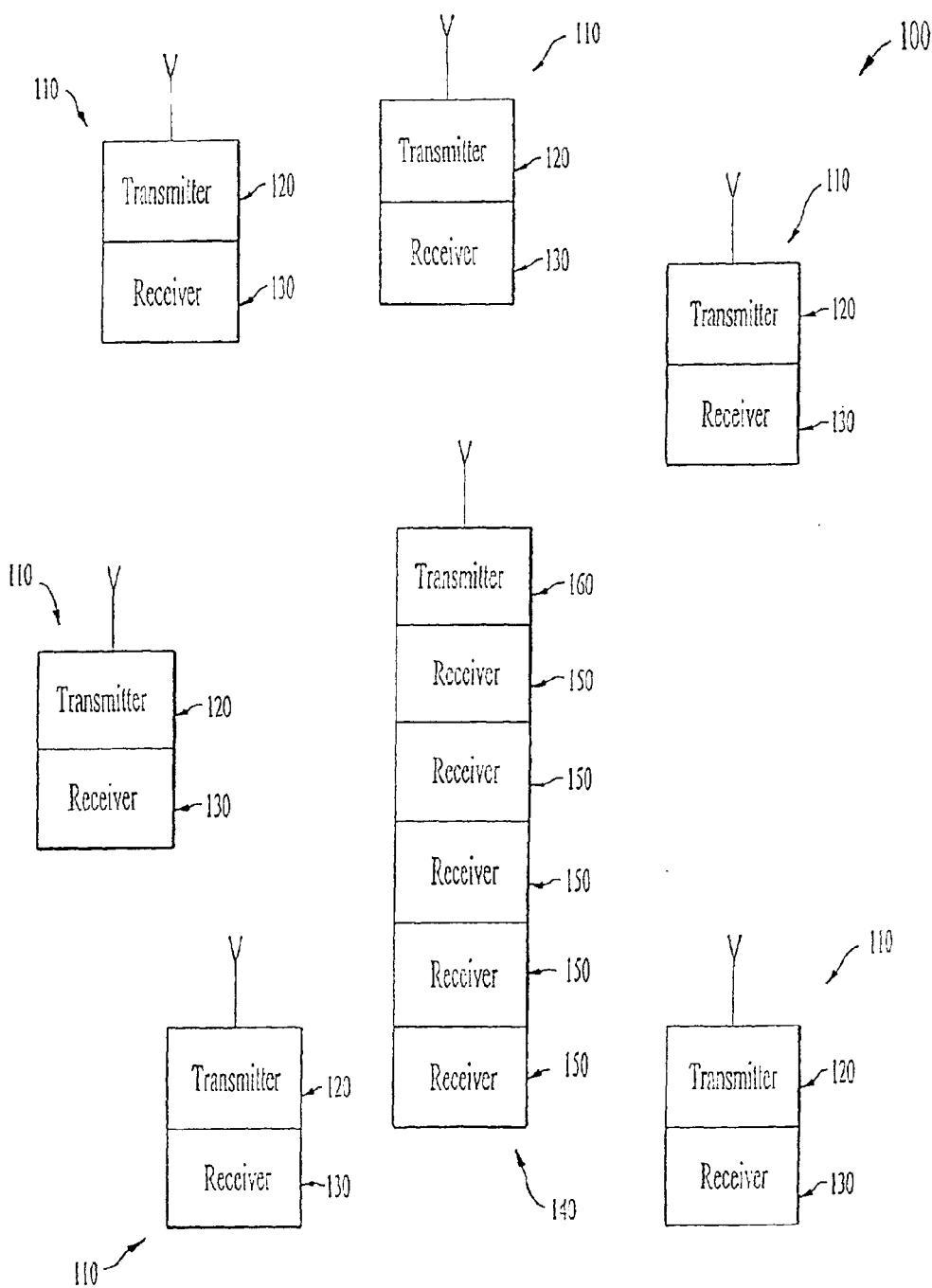
FIG. 1 shows terminals in a burst-type communication system which may incorporate one or more aspects of the present invention.

FIG. 1 shows a burst-type communication system 100 comprising a plurality of communication terminals 110. Each communication terminal 110 comprises a transmitter 120 and a receiver 130. As shown in FIG. 1, the burst-type communication system 100 may also have a communication hub 140 which may simultaneously communicate with a plurality of the communication terminals 110. In that case, the communication hub 140 may comprise a plurality of communication receivers 150 and a transmitter 160.

Some burst-type communication systems may use symbols which are very simple in nature, such as binary phase shift keying (BPSK) using a simple sinusoid or its inverse with duration "T." Other systems may use a direct sequence spread spectrum (DSSS) signal with a more complex symbol, for example, consisting of a sequence of "V" subsymbols, termed "chips." In the latter case, a sequence of subsymbols, or a "PN frame," produced by a PN spreading sequence, makes up a single symbol, which in turn typically conveys one or two bits of information.

In a preferred embodiment of a burst-type communication system according to the present invention, the system may operate in both a "non-spread" (e.g., BPSK) mode and a "spread" (i.e., DSSS) mode.

In the case of operation with BPSK, a transmitter transmits a bi-phase modulated signal of the form, $$s(t) = \sum_{k=1}^{N} m_k(t - kT)\cos(w_0 t) \quad (1)$$

where $m_k(t)$ is a symbol of length T, which takes the value of either +1, corresponding to a logical zero, or −1 corresponding to a logical one, and where $w_0$ is the carrier frequency. At a receiver, the received signal appears much like the transmitted signal of equation (1) except that it includes noise, the time of arrival is unknown a priori, and the carrier frequency and phase may be somewhat in error (due to equipment oscillator differences, Doppler shift, etc.).

In a burst-type communication system, the first "P" transmitted symbols in a burst transmission comprise a preamble. In a preferred embodiment of a burst-type communication system according to the present invention, P=96.

In a preferred embodiment of a burst-type communication system according to the present invention, a burst communication transmitter differentially encodes data prior to transmission. A preamble synchronization sequence, termed a "base synchronization sequence" or "base message" is differentially encoded to produce an "encoded synchronization sequence" or "encoded message" $m_k$.

In a preferred embodiment, a burst-type communication system uses one of "S" allowed base synchronization sequences as a preamble for each burst transmission. The use of "S" base synchronization sequences allows communication of $\log_2(S)$ bits of information, which may be used to specify one of "S" packet lengths (or other information).

In a preferred embodiment, S=4, allowing two bits of information to be communicated by the preamble synchronization sequence. By associating preamble data bits with the selection and transmission of a synchronization sequence, the preamble data may be received by determining which of the allowed preamble synchronization sequences was transmitted. Typically, the preamble synchronization sequence is recovered by integrating over many received symbols. In this way, the preamble data may be received even when the received signal level is very low and when individual symbols are obscured by noise.

A base synchronization sequence may be divided into two or more sections. In a preferred embodiment, a base synchronization sequence includes a first section comprising an initial detection sequence of length "I," and a second section comprising a unique word of length "U." In a preferred embodiment, I=48 and U=47.

In a preferred embodiment, a burst-type communication system uses four base synchronization sequences (base messages):

| | |
|---|---|
| Message 0: | [D0 W0] |
| Message 1: | [~D0 W0] |
| Message 2: | [D0 ~W0] |
| Message 3: | [~D0 ~W0] | where the notation ~W0 and ~D0 means the logical inverse of W0 and D0 respectively.

In a preferred embodiment, a base synchronization sequence is of length 95 symbols, which is differentially encoded to produce an encoded synchronization sequence with a length of 96 symbols. The first 48 symbols of the base synchronization sequence, comprising an initial detection sequence, are used for initial signal detection and symbol timing synchronization. The latter 47 symbols, comprising a unique word, are used for message synchronization to the onset of payload data.

In a preferred embodiment, a burst-type communication system uses a first set of four base synchronization sequences, or base messages, when operating in a non-spread, BPSK, mode and a second set of four base synchronization sequences, or base messages, when operating in a PN spread, DSSS, mode.

In a preferred embodiment, in the case of operation in a DSSS mode, D0 is a sequence of 48 logical zeros, i.e.,

| | |
|---|---|
| D0$_{DSSS}$ = [0 0 . . . 0] | (i.e., 48 0's); | and W0 is a 47 symbol unique word:

W0 = [1 0 0 1 1 0 0 1 1 0 0 0 0 1 1 0 1 1 1 1 1 0 0 0 0 1 1 0 1 0 0 1 1 0 1 0 1 0 0 1 0 1 0 1 0 0 0]

The above unique word W0 has very good correlation properties, however the choice of unique word can be made programmable.

In a preferred embodiment, a communication receiver uses the initial portion of the preamble, comprising an initial detection sequence, to provide a symbol timing synchronization. However, when D0 is transmitted as a sequence of 48 consecutive logical zeros, then there are no transitions between symbols and hence no information to determine symbol timing. When DSSS is employed with a PN spreading sequence, a communication receiver may utilize a PN matched filter, matched to the PN spreading sequence, to convert the DSSS signal into a series of correlation spikes, one per PN frame. The timing of these correlation spikes provides symbol timing information for synchronizing the receiver. However in the non-spread case, a different D0 sequence must be used to provide symbol timing information.

In a preferred embodiment, in the case of operation in a non-spread BPSK mode, D0 is a sequence wherein every other symbol is set to a logical zero, i.e.:

$$D0_{BPSK} = [\text{off } 0 \text{ off } 0 \ldots 0 \text{ off } 0],$$

wherein an "off" symbol corresponds to $m_k$ having a value of 0, that is, the carrier is turned off for this symbol; and W0 is the same as for the case of operation in the DSSS mode. In this case, to determine ~D0, an "~off" symbol is the same as an "off."

In a preferred embodiment, a burst-type communication system employs differential encoding of the four base synchronization sequences to produce four encoded synchronization sequences.

In the case of operation in a PN spread (DSSS) mode, to perform the differential encoding, the first encoded symbol in the encoded synchronization sequence is defined as a logical zero, i.e., the encoded message begins with a logical zero. The polarity of each succeeding message symbol is reversed if the next symbol of the base message is a one, and the polarity is unchanged if the next symbol of the base message is a zero. Differential decoding of the received encoded synchronization sequence produces the original base synchronization sequence.

As an example, if Message 0 is used as a base synchronization sequence, it is differentially encoded to produce an encoded synchronization sequence, or encoded message:

Encoded Message: [0 D0$_{DSSS}$ W$_{DSSS}$]
where W$_{DSSS}$ is the length 47 sequence:
[1 1 1 0 1 1 1 0 1 1 1 1 1 0 1 1 0 1 0 1 0 0 0 0 0 1 0 0 1 1 1 0 1 1 0 0 1 1 1 0 0 1 1 0 0 0 0]

If this message is differentially decoded, it produces the base Message 0, i.e. [D0$_{DSSS}$ W0$_{DSSS}$]. The other three messages are encoded similarly. Conveniently, an encoded message may be differentially decoded by a differential detector which exclusive-or's adjacent bits in the encoded message.

It should be noted that even though W and ~W are logic inverses of one another, after differentially encoding each of these to create transmitted sequences, they are not either logical or arithmetic inverses of one another.

In the case of operation in a non-spread (BPSK) mode, the first encoded symbol in the encoded synchronization sequence is defined as a logical zero, i.e., the encoded message begins with a logical zero. Unlike the case with DSSS, when operating in a non-spread BPSK mode, the data is encoded by using symbols spaced apart by two to accommodate the "off" symbols in the D0$_{BPSK}$ sequence. The encoded message may be formed by splitting the base synchronization sequence into two streams of even and odd symbols, differentially encoding each stream, and then interlacing the result.

As an example, if Message 0 is used as a base synchronization sequence, it is differentially encoded to produce an encoded synchronization sequence, or encoded message:

Encoded Message: [0 D0$_{BPSK}$ W$_{BPSK}$]
where W$_{BPSK}$ is the length 47 sequence:
[1 0 1 1 0 1 0 0 1 0 1 0 1 1 0 1 1 0 0 1 1 1 1 1 1 0 0 0 1 0 1 1 0 1 1 1 0 1 0 0 0 1 0 0 0 0 0]

To differentially decode this message, the convention is used that an "off" is treated as a logical zero and that differential encoding of two "offs" always produces another "off."

When this message is differentially decoded with respect to every other symbol, as described above, it produces the base Message 0, i.e. [D0$_{BPSK}$ W0$_{BPSK}$]. The other three messages are encoded similarly. Conveniently, a differentially encoded message may be differentially decoded by a differential detector which exclusive-or's together every other bit in the encoded message.

The encoded message is mapped to transmitted data by mapping a logical 0 to +A, a logical 1 to −A, and an "off" to a 0, where A is a peak signal amplitude. In the case where DSSS is employed, before transmission each of the symbols is multiplied by one PN frame, or sequence of subsymbols, to spread the signal.

Figure 2:
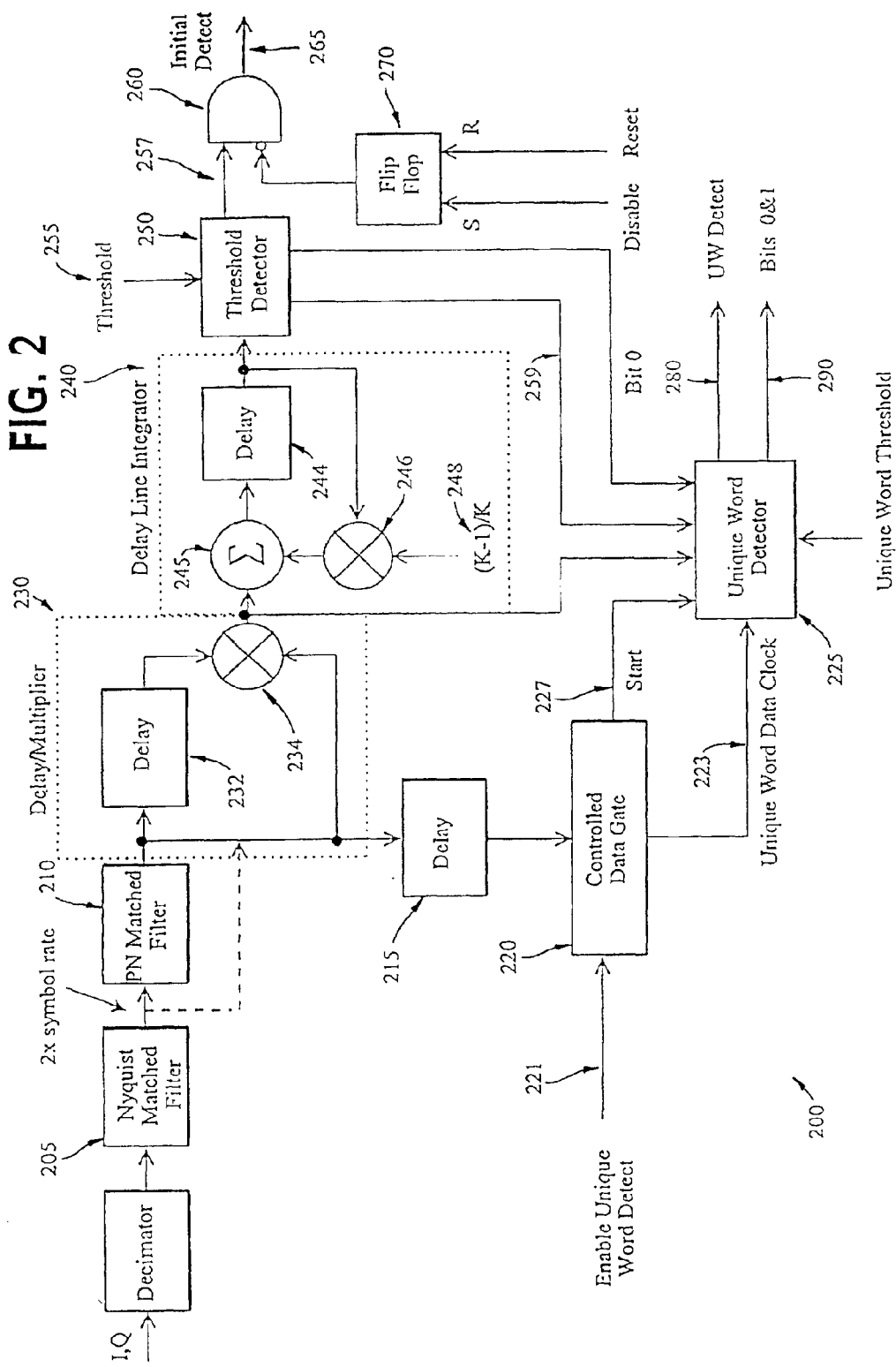
FIG. 2 is a functional block diagram of a preferred embodiment of a preamble detector in a communication receiver for burst-type transmissions.

FIG. 2 shows a preferred embodiment of a communication receiver 200 for detecting the signal described by equation (1) in the presence of strong noise, as well as providing symbol and message timing synchronization, and preamble data extraction.

The transmitted signal of equation (1) is downconverted to near zero frequency using an in-phase/quadrature demodulator to produce I and Q signals as shown in FIG. 2. At this point the signal may be represented in quadrature format as:

$$s_r(t) = A \sum_{k=1}^{N} m_k(t - kT - \tau)\exp(jw_1 t + j\theta) \quad (2)$$

where t represents the unknown arrival time, $w_1$ represents the near baseband frequency, and q represents unknown carrier phase.

The downconverted signal is provided to a Nyquist matched filter 205, matched to the transmitted symbol. The Nyquist matched filter 205 enhances signal energy and reduces out-of-band noise energy. In the case of a non-spread BPSK transmission, the data into the Nyquist matched filter is sampled at four times per symbol, while the data out of the Nyquist matched filter is sampled at twice the symbol rate. In the case of a PN spread DSSS transmission, the data into the Nyquist matched filter is sampled at four times per subsymbol, or 4V times per symbol, while the data out of the Nyquist matched filter is sampled at twice the subsymbol rate, or 2V samples per symbol, where "V" is the length of the PN spreading sequence.

When the burst-type communication system employs DSSS, the Nyquist matched filter output signal is provided to a separate subsequent PN matched filter 210 of length "V." The PN matched filter 210 is tapped at every other sample and produces a PN correlation spike when the input signal matches the predetermined PN subsymbol sequence of length V stored in the matched filter. The time at which the PN correlation spike occurs may be used to provide subsymbol timing information to the receiver. As the data is processed at a rate of two samples per subsymbol (2V samples per symbol), the PN correlation peak may provide timing information to an accuracy of ±¼ of a subsymbol period.

When the system employs a non-spread BPSK signal, the PN matched filter is bypassed.

The output of the PN matched filter (for DSSS), or the Nyquist matched filter (for non-spread BPSK), is provided to a delay block 215. The delay block delays the filtered data by "X" symbol periods before providing it to a controlled gate 220. In a preferred embodiment, "X" is 64 symbols, or 64V subsymbols. The controlled gate provides the data to the rest of the receiver for further processing. The controlled gate 220 also provides a start signal and a data clock to a unique word detector 225 as will be described in more detail below.

The output of the PN matched filter (for DSSS), or the Nyquist matched filter (for non-spread BPSK), is also provided to a delay-multiplier block 230 comprising a delay 232 and a multiplier 234. In the case of a non-spread BPSK transmission, the delay 232 is two symbols in length, corresponding to four data samples. In the case of a spread DSSS transmission, the delay 232 is equal to "2V" subsymbols, corresponding to two data samples per subsymbol for the PN sequence of length V.

The delay-multiplier block 230: (1) performs a differential decoding operation on the symbols $m_k$, and (2) removes the effects of the carrier. In particular the delay-multiply operation produces the signal:

$$s_r(t) = A^2 \exp(jw_1 T) \sum_{k=1}^{N} m_k(t - kT - \tau) m_k(t - kT - T - \tau) \quad (3)$$

If M(t)=m(t)*m(t−T), then (3) becomes:

$$s_r(t) = A^2 \exp(jw_1 T) \sum_{k=1}^{N} M(t - kT - \tau) \quad (4)$$

Because the signal (2) above is complex, the multiplication is also actually complex, with one of the terms conjugated. This leads to equations (3) and (4). Note that differential decoding has removed the carrier phase uncertainty from the received signal.

The data M corresponds to the original data that was differentially encoded at the transmitter to construct the encoded message that was transmitted.

In a preferred embodiment, the first symbols of a burst transmission correspond to a base message (or base synchronization sequence). In the case of DSSS transmission employing the base messages M0, M1, M2 and M3, the initial portion of the message corresponds to $D0_{DSSS}$ or $\sim D0_{DSSS}$. In that case, the first 48 symbols are either logical zeros or logical ones, and the received and differentially decoded signal can be integrated over these 48 symbols to detect the start of a received burst transmission.

In the case of non-spread BPSK transmission employing the base messages M0, M1, M2 and M3, the initial portion of the message corresponds to $D0_{BPSK}$ or $\sim D0_{BPSK}$. In that case, every other symbol among the first 48 symbols are either logical zeros or logical ones, and the received and differentially decoded signal can be integrated over these 24 symbols to detect the start of a received burst transmission.

In the preferred embodiment of FIG. 2, the output of the delay-multiplier 230 is provided to a delay line integrator 240, comprising an adder 242, a delay 244, a feedback summer 245, a multiplier 246, and a feedback ratio constant 248. In the case of a non-spread BPSK transmission, the delay 244 is two symbols in length, corresponding to four data samples. In the case of a spread DSSS transmission, the delay 244 is equal to "2V" subsymbols, corresponding to two data samples per subsymbol for the PN sequence of length V. The delay line integrator 240 is a leaky integrator with a time constant of "K" symbols and a feedback ratio constant 248 equal to (K−1)/K. The feedback constant 248 may be programmable. In the case of DSSS transmission, K may be 32 symbols, whereas in the non-spread BPSK case, K may be 16 symbols.

The delay line integrator 240 integrates the received signal to produce an initial detection signal. When the received signal corresponds to the initial detection sequence D0 or ~D0, then the delay line integrator 230 produces an initial signal detection peak, which is either positive or negative in accordance with whether D0 or ~D0 is received.

The output of the delay line integrator 240 is provided to a threshold detector 250. The threshold detector 250 is also supplied with an initial detection threshold 255, which may be a programmable value from a microprocessor. The threshold detector 250 determines the timing of an initial signal detection peak to provide symbol (or subsymbol) timing information for the receiver 200. In response to an initial signal detection peak, the threshold detector produces an initial detection strobe signal 257 when both the absolute value of the initial signal detection peak exceeds the threshold 255, and is a local peak signal.

The threshold detector 250 also performs an interpolation to determine whether the initial detection strobe signal 257 corresponds to a "true peak." The threshold detector 250 provides a two-bit peak timing output signal 259 indicating whether the initial detection strobe signal 257 was "early," "late," or "punctual" with respect to the true peak.

When the threshold detector 250 qualifies the delay line integrator output as an initial detection peak, the threshold detector provides the initial detection strobe signal 257 to a first input of an initial detection gate 260. The second input of the initial detection gate 260 is connected to the output of a flip-flop 270. The flip-flop 270 is reset to enable an Initial Detection Output Signal 265 from the gate 260 during time periods when the receiver is seeking a burst-type transmission, and is set to disable the Initial Detection Output Signal 265 during time periods when the receiver is not seeking a burst-type transmission, for example because it is busy processing another signal. The Initial Detection Output Signal 265 indicates detection of an initial detection sequence for a burst transmission and provides symbol timing for the burst. The Initial Detection Output Signal 265 may be provided to a microprocessor or to an arbitration circuit in a receiver which may control the flip-flop 270.

The threshold detector 250 is a double detector which detects both positive and negative peaks, as the peak signal polarity is either positive or negative, depending upon whether D0 or ~D0 is transmitted. This polarity of the initial detection strobe provides a first preamble information bit, Bit0, indicating whether D0 or ~D0 was received. The first preamble information bit, Bit0, is provided to the unique detector 225.

After the initial detection sequence of length I, the symbols that follow represent a unique word of length U. In a preferred embodiment, I=48 symbols and U=47 symbols. Detection of the unique word is performed by the unique word detector 225. Because the initial detection strobe is produced by integrating the received signal over many symbols, the first preamble information bit may be received even when individual received symbols are weak relative to the noise level.

The controlled gate 220 receives an Enable Unique Word Detect signal 221 from an arbitration circuit or a microprocessor in the communication receiver, synchronized to the symbol timing determined by the threshold detector 250 and provided in the Initial Detection Output Signal 265. The controlled gate uses an internal counter to produce a unique word data clock signal 223, providing one clock cycle per data symbol in the received base synchronization sequence. The counter is synchronized to the received symbols by the Enable Unique Word detect signal 221 which in turn is synchronized to the time of occurrence of the peak in the initial detection strobe signal 257. For the DSSS case, the counter produces one clock cycle per PN frame.

The delay-multiplier 230 provides the differentially decoded base synchronization sequence data to the unique word detector 225 for detection of the unique word. The base synchronization sequence data is clocked into the unique word detector 225 by the unique word data clock signal 223 provided by the controlled gate 220. The unique word detector 225 may adjust the timing of the unique word data clock signal 223 using the two-bit peak timing output signal 259.

In a preferred embodiment, the unique word detector 225 has an impulse response which is a symbol-reversed version of W0, as described previously. The unique word detector 225 compares the received data to a pattern matching the original unique word W0.

The unique word detector 225 includes a unique word matched filter which conveniently may be implemented as a tapped delay line. In that case, the output of the unique word matched filter is low in amplitude until the input data corresponding to the unique word is time aligned with the matched filter taps, at which point a strong positive or negative going peak occurs, depending upon whether W0 or ~W0 is received. The time of occurrence of this peak determines the time-of-arrival of the message, i.e., it provides payload time synchronization information.

Figure 3:
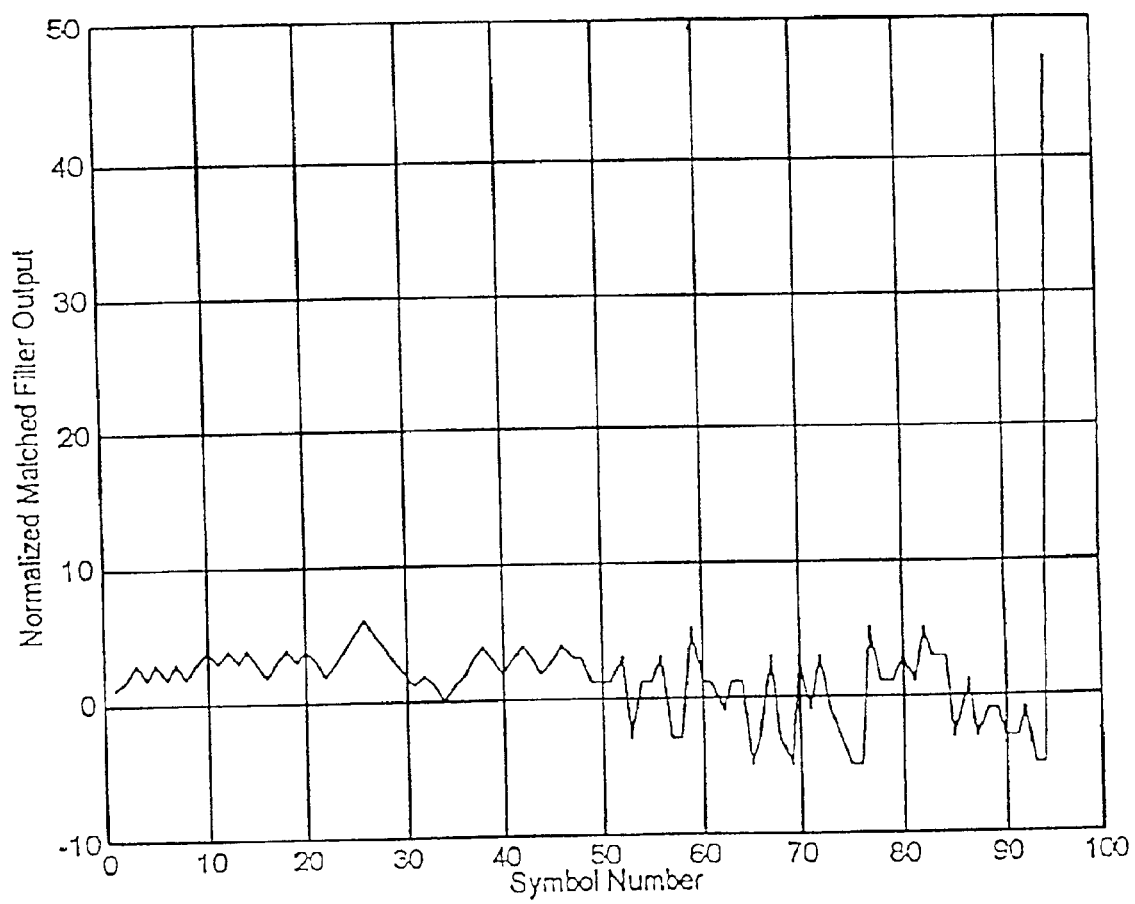
FIG. 3 is a simulated output of a unique word matched filter when receiving a unique word synchronization sequence.

The polarity of the peak in the unique word detector 225 provides a second preamble information bit, Bit1, indicating whether W0 or ~W0 was received. Thus two total bits of information are communicated in the preamble synchronization sequence. The unique word detector 225 provides the first and second preamble information bits as an output 290. These bits may be used to provide four possible payload lengths, or other formatting details regarding the following payload data. FIG. 3 shows a simulated output of a matched filter matched to the aforementioned base unique word W0. If ~W0 were utilized instead, then the peak in FIG. 3 would be negative going.

In a preferred embodiment, the controlled gate 220 provides a start signal 227 which opens a detection time window in the unique word detector 225 to detect the reception of a valid unique word beginning "Y" symbols after the initial signal detection peak. The detection time window is "Z" symbol periods long, with the unique word detector including a counter to count the "Z" symbol periods. The unique word detector 225 provides a unique word detection output signal 280 containing a valid unique word detection peak only during the interval of the detection time window. In a preferred embodiment, Y may be 32 symbols and Z may be 64 symbols.

Significantly, the actually transmitted differentially encoded data $m_A(t)$, corresponding to the unique word sequence W0, and the transmitted differentially encoded data $m_B(t)$, corresponding to the unique word sequence ~W0, are not sign-inverted versions of one another. Only after differential decoding are the base sequences W0 or ~W0 produced. Similarly the initial detection sequences, D0 and ~D0, do not produce transmitted sequences which are logical or arithmetic inverses of one another.

In the preferred embodiment, each section of the preamble synchronization sequence contains one of two possible base sequences of waveforms. Processing each section requires, in general, two matched filters. However, in a preferred embodiment, in each section the two base sequences differ from one another by a polarity inversion, so that only one matched filter is required in each section.

In the more general case, a burst-type communication terminal may select among more than two allowed base preamble sequences of waveforms. This allows communication of additional bits of information. In general, one of S/2 allowed base sequences of waveforms may be transmitted as an initial detection sequence in the preamble (e.g. the first 48 symbols), communicating $\log_2(S/2)$ first preamble information bits. Similarly, one of S/2 sequences of waveforms may be transmitted as a unique word in the preamble (e.g. the last 47 symbols), communicating $\log_2(S/2)$ second preamble information bits. Thus, the receiver receives one or more first preamble information bits after detecting the initial detection sequence. The receiver then receives one or more second preamble information bits after detecting the unique word.

For example, one of four allowed sequences of waveforms may be transmitted during an initial detection portion of the preamble (e.g. the first 48 symbols). In general, this requires the use of up to four matched filters in the receiver, although this may be reduced to two matched filters if the four allowed sequences are selected as two pairs, such that the base sequences in each pair differ from each other by a polarity inversion. This allows communication of two bits of information in the initial detection sequence.

More generally, the preamble may be divided into R sections. transmitting one of say L base sequences of symbols in each section. In that case, the total number of bits of information communicated in the preamble is $\log_2(L*R)$. For simplicity one might choose the same set of base sequences for each section, thus limiting the number of matched filters to at most L, and perhaps L/2 if the base sequences are chosen as pairs of sequences which are inverses of each another.

The transmitted symbols do not have to be simply bi-phase shifted data, as in equation (1). More complex data, such as quadra-phase shifted data may be utilized. In this case, however, the unique word detector of FIG. 2 may be more complex since it must detect the more complex waveforms created by differentially decoding these more complex symbols.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. In a burst-type communication system comprising a transmitter and a receiver, a method of communicating information in a preamble synchronization sequence of a burst transmission, comprising:

selecting, at the transmitter, a selected one of a plurality of initial detection sequences, representing one or more first preamble information bits;

selecting, at the transmitter, a selected one of a plurality of unique words, representing one or more second preamble information bits;

transmitting, at the transmitter, said preamble synchronization sequence comprising said selected one initial detection sequence and said selected one unique word;

receiving, at the receiver, said preamble synchronization sequence;

detecting, at the receiver, said one initial detection sequence to produce first time synchronization information and to receive said one or more first preamble information bits; and detecting, at the receiver, said one unique word to produce second time synchronization information and to receive said one or more second preamble information bits;

wherein the plurality of initial detection sequences comprises one or more pairs of initial detection sequences, wherein each pair of initial detection sequences comprises a first initial detection sequence and a second initial detection sequence, said second initial detection sequence being a logical inverse of said first initial detection sequence.

2. In a burst-type communication system comprising a transmitter and a receiver, a method of communicating information in a preamble synchronization sequence of a burst transmission, comprising:

selecting, at the transmitter, a selected one of a plurality of initial detection sequences, representing one or more first preamble information bits;

selecting, at the transmitter, a selected one of a plurality of unique words, representing one or more second preamble information bits;

transmitting, at the transmitter, said preamble synchronization sequence comprising said selected one initial detection sequence and said selected one unique word;

receiving, at the receiver, said preamble synchronization sequence;

detecting, at the receiver, said one initial detection sequence to produce first time synchronization information and to receive said one or more first preamble information bits; and detecting, at the receiver, said one unique word to produce second time synchronization information and to receive said one or more second preamble information bits;

wherein detecting the one initial detection sequence includes:

generating, at the receiver, an initial signal detection peak in response to the preamble synchronization sequence; and determining a polarity of the initial signal detection peak to receive one of said one or more first preamble information bits.

3. A communication receiver receiving a preamble synchronization sequence comprising an initial detection sequence and a unique code word, said receiver comprising:

means for detecting the initial detection sequence to produce therefrom one or more first preamble information bits; and means for detecting the unique word to produce therefrom one or more second preamble information bits;

wherein the means for detecting the initial detection sequence comprises:

a delay line integrator receiving the initial detection sequence and producing therefrom an initial signal detection peak; and a threshold detector receiving the initial signal detection peak and producing therefrom the one or more first preamble information bits;

wherein the threshold detector determines a polarity of the initial signal detection peak and provides the one first preamble information bit corresponding to the polarity of the initial signal detection peak.

4. A communication receiver receiving a preamble synchronization sequence comprising an initial detection sequence and a unique code word, said receiver comprising:

means for detecting the initial detection sequence to produce therefrom one or more first preamble information bits; and means for detecting the unique word to produce therefrom one or more second preamble information bits;

wherein the means for detecting the initial detection sequence comprises:

a delay line integrator receiving the initial detection sequence and producing therefrom an initial signal detection peak; and a threshold detector receiving the initial signal detection peak and producing therefrom the one or more first preamble information bits;

wherein the threshold detector produces an initial detection output signal indicating a timing of the initial detection sequence.

5. The communication receiver of claim 4, including an initial detection gate enabling the initial detection output signal during time periods when the receiver is seeking to receive a burst-type transmission including the preamble synchronization sequence, and disabling the initial detection output signal during time periods when the receiver is not seeking to receive a burst-type transmission including the preamble synchronization sequence.

6. A communication receiver receiving a preamble synchronization sequence comprising an initial detection sequence and a unique code word, said receiver comprising:

means for detecting the initial detection sequence to produce therefrom one or more first preamble information bits; and means for detecting the unique word to produce therefrom one or more second preamble information bits;

wherein the means for detecting the unique word includes a matched filter matched to the unique word;

wherein the matched filter is a tapped delay line producing a correlation peak when the unique word is detected; and wherein the means for detecting the unique word determines a polarity of the correlation peak and provides the one second preamble information bit corresponding to the polarity of the correlation peak.

* * * * *